(12) United States Patent
Petracca

(10) Patent No.: US 6,942,569 B2
(45) Date of Patent: Sep. 13, 2005

(54) DRAWING FOR WINNERS OVER THE INTERNET USING RECEIPTS AND ZIPCODES

(76) Inventor: Anthony Petracca, 142 Washington Ave., Fort Lee, NJ (US) 07024

( * ) Notice: Subject to any disclaimer, the term of this patent is extended or adjusted under 35 U.S.C. 154(b) by 246 days.

(21) Appl. No.: 10/360,792

(22) Filed: Jun. 11, 2002

(65) Prior Publication Data
US 2004/0106453 A1 Jun. 3, 2004

(51) Int. Cl.[7] .................................................. A63F 9/24
(52) U.S. Cl. .............................. 463/17; 463/40; 463/41; 463/42; 705/14
(58) Field of Search .......................... 463/16–31, 40–42; 273/138.1, 138, 139, 224, 269; 705/14; 700/91–93; 235/375–386

(56) References Cited

U.S. PATENT DOCUMENTS 6,173,267 B1 * 1/2001 Cairns .......................... 705/14
6,251,017 B1 * 6/2001 Leason et al. ................. 463/42

* cited by examiner

Primary Examiner—Michael O'Neill

(57) ABSTRACT

In this Automatic Electronic Entry allows entry for the award drawing using electonic receipts. Users with receipts from electronic ATMs, debit card, EZ Pass and Internet merchants and other fee and receipt collectors would have the option to be automatically entered into the drawings through means other than registering and entering into the games manually via the web site. All receipts will be entered into all daily, weekly, monthly and year end games. Receipts will continued to have the information such as data and time. Individuals will have the option at the time of purchase or ATM transaction to participate in the drawing.

8 Claims, 2 Drawing Sheets

FIG. 1A

```
        /-12           /-10
FIRST BANK
ATM - MAIN ST. /-11
Date    Time
-05/30/00    9:07 /-14
ATM No. 74154 /-15
Account No. ending
with 1688
Amount    $100.00
Available Balance $1,745.00
```

FIG. 1B

```
                        /-20A
DRUG STORE ONE
Store No. 173 /-21
                    /-22
121 Main St. Armonk
-10504
Epsom Salt ...... $1.99 /-25
Tax ....... 0.06 /-26
Total ..... $2.05
CASH ........... $10.00
CHANGE ......... $7.95 /-29
DATE      TIME
05/30/00  9:08 /-31
```

FIG. 1C

```
              /-32A
GOOD EATS
121 Main St.
Armonk, NY 10504
                /-34
Amex. 074329722
Check No. .... 743216
Amount .... $92.50 /-36
Tax ....... 5.20 /-37
Tip ....... 7.00 /-38A
Total ...$104.70 /-38B
DATE: 05/30/00
```

DRAWING FOR WINNERS OVER THE INTERNET USING RECEIPTS AND ZIPCODES

This application incorporates by reference the provisional application Ser. No. 60/421,124 (Previously Assigned Ser. No. 10/166,799) for conversion into this nonprovisional application.

FIELD OF THE INVENTION

The present invention is related to the playing of a game of chance or sweepstake over the Internet, and more particularly to the random selection (drawing) of a winner among those who log onto a web site.

BACKGROUND OF THE INVENTION

At the present time there are many types of games of chance in which a winner is selected using a random process. For example, in a state-sponsored lottery or sweepstake a person buys a lottery ticket and selects a series of numbers, i.e., he selects 5 or 6 numbers with each number being from 1 to 50. A series of numbers is then derived by a random process, such as by dropping numbered ping-pong balls.

Various games of chance are shown in the U.S. Pat. Nos. 6,024,641; 6,017,032; 5,938,200; 5,855,369; 5,791,991; 4,721,309; 4,689,742 and 4,494,197.

A "drawing" is a similar type of game, except the numbers are assigned to the players and not selected. For example, all the persons at a concert are told to hold on to their ticket stubs. The stubs are numbered. At the end of the concert a number is randomly selected and the person with the ticket stub holding that number wins a prize.

This general idea, of picking a winner at random, has been used by various Internet web sites in order to attract viewers. In one example, a web site, which is the "server", advertises that it will give cash prizes to winners, which are its "clients". The prize may be an award of $1000 each day. The person logs on to the web site to enter the contest. The web site derives revenue from selling advertisements which are displayed to viewers who log on to its site. The winners, presumably, are selected by some random process.

This type of game is a "drawing", as distinct from a "lottery", since the user does not purchase a ticket. In general a lottery, in which the user pays to enter the game, may be illegal in various states of the United States of America and in some foreign countries. In New York State, the Penal Law Section 225 defines "Gambling" as when "A person . . . stakes or risks something of value upon the outcome of a contest or chance or a future contingent event . . ."

Those Internet drawings, in which the users log on and obtain a chance of winning, without paying to enter, may not be "gambling" and may therefore be legal.

Also, at the present time, persons who purchase goods and services, such as restaurant meals, gasoline, grocery items, clothing, movie theater tickets, etc., generally receive a receipt for their purchase. Such receipts are almost always given when the items are purchased using a credit card. The receipt generally has the date and very often has the time (hour and minute) that the receipt is printed. Many receipts also display the ZIP (postal) code of the establishment. Some people save such receipts for their records, but many others throw them away. In addition, other types of paper documents are printed with a time and date, including parking tickets, ATM receipts, and bank deposit receipts.

SUMMARY OF THE INVENTION

In accordance with the present invention, a system and method is provided in which customer receipts may be used in a legal prize-awarding drawing on the Internet.

In this invention, a user (client computer or "client") will log onto a special web site of a server computer ("server") devoted to the drawing, called herein "drawing site" or "web drawing site".

The drawing site will display a page having blank spaces which are to be filled in by the user. These blank spaces call for the identification of a user's receipt by its date, time and ZIP code. The term "receipt" means any paper slip having a time and date, including parking tickets, ATM receipts, etc. The receipt may be for any purchase, from any vendor, and may be for any day, within a selected limit, i.e. the most recent 30 days.

This activity is generally legal since it does not require any purchase by, or money from, the users ("players"). It is not "gambling" since the player does not stake or risk anything of value. It is not a "lottery" since the players do not pay something of value for chances represented by numbers.

In some cases, receipts which are issued have a date, but not the time. In that case, preferably a time is assigned by the drawing web site based upon the exact time the user logs onto the site. Alternatively, the user may be asked to select a time. The drawing web site has a box (blank) to be filled in by the user with a ZIP (postal) code. Preferably it is the ZIP code shown on the receipt. If there is no ZIP code used on the receipt, the user may use his/her home or office ZIP code. If the user does not enter a ZIP code, or if the user is in a foreign country, the drawing web site automatically assigns a ZIP code (5-digit number) to the user. Since there are 1440 minutes a day and 10,080 minutes a week, the use of a 5-digit ZIP code (with about 74,000 U.S. ZIP codes) gives odds of 1 in about 746 million. To reduce the odds, the drawing web site can use only a few of the digits (initial or terminal) of the ZIP code.

When the user logs on to the drawing web site, for the first time, he/she is asked to enter either the user's e-mail address or the user's name and postal address, i.e. registration. The drawing web site retains a record of the user's URL and his/her return address (e-mail or name/postal address). The user need not enter that information again, because the drawing web site automatically receives and records the user's URL each time the user logs on to that site.

At selected times the drawing web site selects one, or more, winners. Such selection may be made, for example, on a daily, weekly, monthly and/or yearly basis. Preferably, the client's receipt information and address ("entry information") is saved, so that the saved entry is automatically entered into the weekly and/or yearly drawing—even though it has lost a daily drawing.

The selection is made by a random process, i.e. a random number generator. The drawing web site knows the Internet address of the winners since it saves the incoming addresses of all users until the winners are selected.

The drawing web site obtains its revenue from selling advertising space on its web site. It does not collect a fee from the users, so it is not running a lottery or an illegal gambling enterprise.

Another method which may be used for entering into the drawing will be for retail stores or other charge or fee collector locations to be linked to the Internet for access to the web site and data base. The receipt may be scanned or manually processed for immediate entry into the drawing. During or after purchase the consumer may instruct retail store employee to enter the electronic receipt for them into the drawing by manual input or scanning the receipt document from a PC or Palm Pilot system connected to the web site or data base. The system may or may not be directly dedicated to the data base and web site. If the zip code is not present on the document it will automatically obtain the zip code of the retail store location.

This invention includes a method of conducting a drawing sweepstake over the Internet where a plurality of players obtain a receipt and each of the receipts displays a time and a date. The players each log onto the Internet and communicate with a server drawing web site. The drawing web site displays a web page having a place indicating that it is to be filled in with a time and a date and the player then fills in the place with the time and date from the receipt. The drawing web site displays a page also having a place to be filled in with a zip code from the receipt, when there is no zip code on the receipt, a zip code is automatically randomly assigned by the web site and the place is automatically filled in. The drawing web site randomly selected a time, a date and a portion or all of a zip code and awards a prize to a player whose time, date and zip code most closely matches the selected time, date and zip code.

The method also includes conducting a drawing sweepstake over the Internet where a plurality of players obtain a receipt and each of the receipts displays at least a date. The players each log onto the Internet and communicate with a server drawing web site. The drawing web site displays a web page with a place indicating that it is to be filled in with a date and the player fills in the place with the date from the receipt. The drawing web site displays a page also having a place to be filled in by the time on the receipt, when there is no time on the receipt, the log on time is automatically used. The drawing web site displays a page also having a place to be filled in with a zip code from the receipt. When there is no zip code on the receipt, a zip code is automatically randomly assigned by the web site and finally the finally the drawing web site randomly selects a date, time and portion or all of a zip code and awards a prize to a player whose date and time and zip code most closely matches the selected date and time and zip code.

The receipts may be in the form of an electronic data receipt such as retail store purchase receipts, restaurant receipts, credit card purchase receipts, gasoline purchase receipts, ATM receipts, parking receipts, theater ticket receipts and fee collectors receipts such as EZ pass receipts.

The method of this invention may also use documents including paper receipts.

The method of this invention may conduct drawing sweepstake over the Internet using data from electronic receipts from a provider merchant or fee collector where a plurality of players obtain an electron receipt from a provider with each receipt displaying at least a time and a date. The provider logs onto the Internet and communicates with a server drawing web site. The drawing web site displays a web page having a place where it is filled in with a time and a date by the provider. The drawing web site displays a page also having a placed to be filled in with a zip code from the electronic receipt. When there is no zip code on the electronic receipt, the zip code of the provider merchant or fee collector may fill in its own zip code. When no zip code is filled in, a zip code is automatically randomly assigned by the web site and the place is automatically filled in and finally the drawing web site randomly selects a time, a date and a portion or all of a zip code and awards a prize to a player whose time, date and zip code most closely matches the selected time, date and zip code.

The method of conducting a drawing sweepstake over the Internet using data from electronic receipts from a provider merchant or fee collector where the receipt only provides a date.

The method of this invention also includes conducting a drawing sweepstake over a network using data from electronic receipts from a provider by logging onto a network and communicating with a server drawing web site. The drawing web site displays a web page having a place which the provider fills in with a time and a date from the receipt displaying at least a time and a date. This step may be automatic. The drawing web site displaying said page also having a place to be filled in with a zip code from the receipt, when there is no zip code on the receipt, a zip code is automatically randomly assigned by the web site and this place is automatically filled in. And finally the drawing web site randomly selects a time, a date and a portion or all of a zip code and awards a prize for the receipt whose time, date and zip code most closely matches the selected time, date and zip code.

BRIEF DESCRIPTION OF THE DRAWINGS

The following detailed description should be taken in conjunction with the accompanying drawings.

In the drawings:

FIGS. 1A, 1B and 1C show typical paper receipts; and

DETAILED DESCRIPTION OF THE INVENTION

I. The Internet

Figure 2:
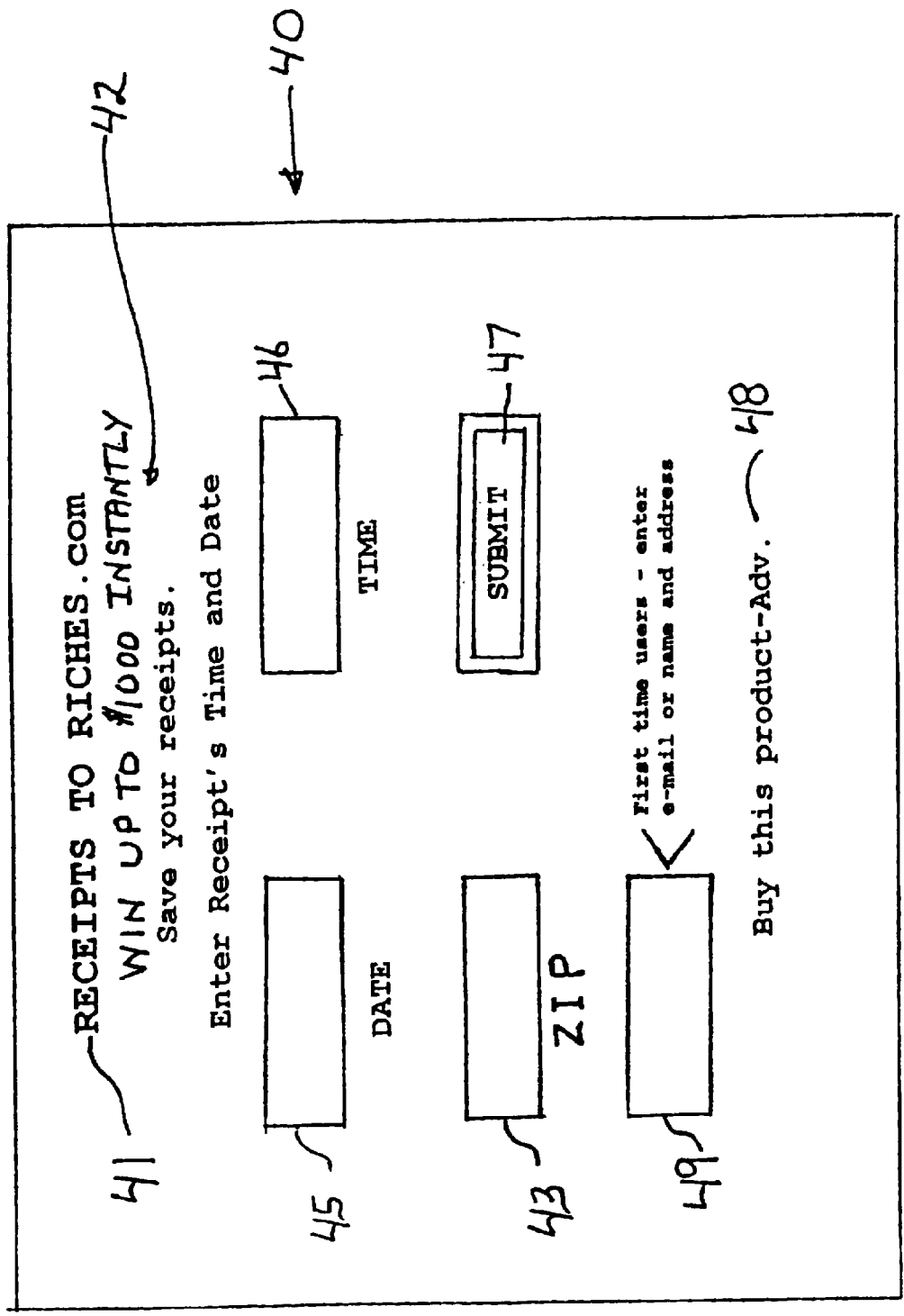
FIG. 2 shows an embodiment of the proposed drawing web site.

The following is a background description of the Internet.

The Internet is a system of geographically distributed remote networks interconnected by computers executing network protocols. Protocols allow users to interact and share information over the networks. A protocol is essentially a set of rules or standards designed to enable computers to connect with one another and to exchange information with as little error as possible. The Internet is an "open" system for which developers can design software for performing specialized operations or services, especially without restriction.

The Internet utilizes the TCP/IP software protocols ("Transport Control Protocol/Internet Protocol"). A protocol is a set of rules governing the format and meaning of messages ("packets") exchanged over networks. Each of the services available over the Internet is generally defined by its own networking protocol.

Electronic information transferred between networks is usually presented in hypertext format, a metaphor for presenting information in a manner in which text, images, sounds, and actions become linked together in a complex, non-sequential web of associations that permit the user to "browse" or "navigate" through related topics, regardless of the presented order of the topics. These links are often established by both the author of a hypertext document and by the user, depending on the intent of the hypertext document. The term "hypermedia" is nearly synonymous with "hypertext" but focuses on nontextual components of hypertext, such as animation, recorded sound, and video. Hypermedia is the integration of graphics, sound, video, or any combination into a primarily associative system of information storage and retrieval.

The Internet follows a client-server architecture. In a client-server architecture, a client is usually a computer that accesses shared network resources provided by another computer (i.e., a server). Based upon user requests, the server presents filtered electronic information as server responses to the client process.

Client and server communicate with one another utilizing the functionality provided by Hypertext Transfer Protocol (HTTP). The World Wide Web (WWW) ("Web") includes all the servers adhering to this standard which are accessible to clients via a Universal Resource Locator (URL). Remote network services such as the World Wide Web are typically accessed by specifying a unique network address (i.e., Universal Resource Locator). Universal Resource Locators have two basic components: the protocol to be used and the object path name. For example, the Universal Resource Locator address, "http://www.uspto.gov" (i.e., home page for the U.S. Patent and Trademark Office) specifies a hypertext transfer protocol ("HTTP") and a URL of the server (e.g., "www.uspto.gov"). The server name is associated with a unique numeric value (i.e., IP address).

Client and server are typically coupled to one another via TCP/IP connections for high-capacity communication. Active within the client is a first process, known as a "browser", which establishes the connection with the server and presents information to the user. The server itself executes corresponding server software which presents information to the client in the form of HTTP responses. The HTTP responses correspond to Web "pages" constructed from a Hypertext Markup Language (HTML), or other server-generated data. HTTP, in the context of the World Wide Web, is a protocol that provides file transfers for hypertext-based information among local and remote systems.

Client and server typically display browsers for utilization by a user via a graphical user interface, a'type of display format that enables users to choose commands, start programs, and see lists of files and other options by pointing to pictorial representations (e.g. icons) and lists of menu items on the screen. Choices can generally be activated either with a keyboard or point device such as a mouse. A browser presents information to a user through a graphical user interface window by displaying images, graphics, or text within the window region. The user, in turn, communicates with the application by "pointing" at graphical objects in the window with a pointer controlled by a hand-operated pointed device or by typing words or numbers in blank spaces (input blocks) within the window.

II. Receipts and the Web Page

Typical receipts are shown in FIGS. 1A–1C.

The receipt 10 of FIG. 1A is from an ATM. It displays the name of the bank 12, the location 11 of the ATM terminal, the date 13, the time 14 (in hours and minutes), the ATM number 15, the card number 16, the serial number 17, the amount withdrawn 18, and the available balance 19.

The receipt 20 of FIG. 1B is from a drug store. It displays the name of the store 20A, the store number 21 and address 22, the store's ZIP code 22A, numbers representing the transaction 23, the item name 24, the item price 25, tax 26, total 27, cash 28, change 29, date 30 and time 31 (hour and minute). Some receipts show seconds, but the seconds are not entered. Some receipts are in 24-hour (military) time, but the drawing web site converts them to ordinary (a.m. and p.m.) time.

The receipt 34 is from a restaurant. It displays the restaurant name and address 32, the ZIP code 32A, the credit card type and number 33, the table 34, check number 35, amount 36, tax 37, tip 38A, total 38B. It displays a date 39—but not a time. In this case, since the receipt does not display a time, a time is assigned to the user by the drawing web page, preferably based on the time the user logs on to that site.

A preferred drawing web site page 40 is shown in FIG. 2. As shown, its heading is a domain name 41 of the applicant, which is "RECEIPT TO RICHES.com". Below that is an announcement 42 indicating that a user (player) has a chance to win a prize. That announcement says, "Win Up To $1000 Instantly. Save Your Receipts."

This illustrates an instant winner type of drawing in which a date and time are pre-selected on a random basis. For example, on June 25 the selection is made that the winner on June 26 will be 9:45 a.m. Anyone who logs on and fills in that time and date will be a winner. If the winning is $1000 and 4 persons are winners, they could each win $250. Preferably, the user (player) enters his/her ZIP code, or the ZIP code of the receipt, into a box 43. If the user does not enter a ZIP code number into box 43, that entry is automatically assigned a ZIP code number, using a random number, by the drawing web site. The winner, among those with the same day and time, is the one whose ZIP code is selected, or comes closest, to a random selected number.

Alternatively, the winners may be selected each month for the prior month. This is not an instant winner situation.

The users (players) are requested to keep their receipts, since they will be required to mail in their original receipts in order to collect their winnings. Store owners, who have copies, but not originals, could not thereby wrongfully pretend to be winners by mailing in the copies.

As shown in FIG. 2, the user need only enter two pieces of information, namely, the date of the receipt in box 45 and the time in box 46. In addition, there may be a box 43 for the players ZIP code, as a way of choosing winners. In all cases the user will then operate the "submit" box 47.

In addition, first time users are requested to enter their e-mail, or their name and address, in box 49. This registers the user. The drawing web site records (in its computer memory) the user's URL and its associated registration information, i.e., e-mail address. The next time the user logs on, his/her URL will identify the user to the drawing web site.

As shown in FIG. 2, an advertisement 48 is displayed to the player. The drawing web site obtains its revenue from the sale of such advertising space.

Automatic Electronic Entry of Electronic Receipt

Another way to enter in drawing is by Automatic Electronic Entry. Users may manually input information needed for the drawing, such as the zip code, date and time from a receipt document via the web site on the Internet.

However, entering by other means will allow users to automatically enter into the drawing using the zip code, date and time of their immediate electronic receipt information from ATMs, debit and credit cards, EZ pass, on-line merchants and Speed pass or speed tag by Exxon. Electronic links using the Internet, servers, data bases may be used to transfer such information.

EXAMPLES OF ELECTRONIC ENTRY

ATM

When individual is completing a transaction, the ATM will ask user to enter this receipt into a drawing using the zip code, date and time as the qualifying fields for the drawing. The user chooses yes to enter the receipt information for the drawing. The proper information will then be extracted from the transaction document and delivered to the drawing data base for storage and participation in the drawings.

On-line Merchants

When finalizing a purchase using an Internet on-line merchant, such as Barnes & Noble.com the consumer may be given a opportunity to automatically enter the receipt information into a drawing. If the user chooses to enter into the drawing, the valid receipt information (zip code, date and time) will be extracted and delivered to the drawing data base via the Internet servers. The user may or may not wish to retain the receipt document for his records. The receipt may be given a ID# for tracking purposes.

Self Swiping Debit and Credit Card

When a individual swipes a card for a purchase during a transaction they will be prompted to a screen asking if the receipt information may be used for a drawing. If accepted, the server will extract automatically the proper information and file it using a ID# in the drawing data base.

EZ Pass

EZ Pass users may be able to participate using the zip code, date and time of the receipt to be entered automatically into the drawing. If accepted as the automobile passes the toll a record of the place, date and time of the transaction is filed on the EZ Pass data base. The valid information of the transaction will then be extracted and automatically delivered electronically to the drawing data base.

Speed Pass or Speed Tag Such as Used by Exxon for Payment for On-line or Other Merchandise Users will be able to participate automatically using the transaction information needed to enter into the drawing. At time of transaction the pertinent information needed to enter the drawing will be extracted and given a ID# for tracking purposes and delivered to the drawing data base via electronic system.

At any time during the drawings when there is a winner, the winner will be notified and traced using the ID#.

This system will enable the user to automatically enter the receipt information rather than to manually input receipt document information.

What is claimed is:

1. A method of conducting a drawing sweepstake at a retail fee collector over the Internet in which:
   (a) a plurality of players obtain an electronic receipt, each of the receipts displaying at least a time and a date;
   (b) at the player's request or with the player's consent, the retail store fee collector logs on to the Internet and communicates with a server drawing web site;
   (c) the drawing web site displays a web page having a place indicating that it is to be filled in with a time and a date and the player's electronic receipt from the retail fee collector is then scanned or manually processed to enter the time and date from the receipt;
   (d) the drawing web site displaying said page also having a place that is filled in with a zip code from the receipt and when there is no zip code on the receipt, a zip code is automatically randomly assigned by the web site and said place is automatically filled in with said randomly assigned zip code, and
   (e) the drawing web site randomly selects a time, a date and also selects a portion or all of a zip code and awards a prize to a player whose data most closely matches said randomly selected data.

2. A method of conducting a drawing sweepstake at a retail fee collector over the Internet in which:
   (a) a plurality of players obtain an electronic receipt, each of the receipts displaying at least a date;
   (b) the retail store fee collector logs on to the Internet and communicates with a server drawing web site;
   (c) the drawing web site displays a web page having a place indicating that it is to be filled in with a date and the player's electronic receipt from the retail fee collector is then scanned or manually processed to enter the date from the receipt;
   (d) the drawing web site displaying said page also having a place that is filled in by the time on the receipt and when there is no time on the receipt, the log on time is automatically used;
   (e) the drawing web site displays said page also having a place that is filled in with a zip code from the receipt and when there is no zip code on the receipt, a zip code is automatically randomly assigned and filled in by the web site, and
   (f) the drawing web site randomly selects a date, time and portion or all of a zip code and awards a prize to a player whose data most closely matches said randomly selected data.

3. A method as in claim 1 or 2 wherein said retail fee collector's receipt is in the form of an electronic data receipt selected from the group consisting of:
   (a) retail store purchase receipts;
   (b) restaurant receipts;
   (c) credit card purphase receipts;
   (d) gasoline purchase receipts;
   (e) ATM receipts;
   (F) parking receipts;
   (g) theater ticket receipts; and
   (h) fee collector receipts.

4. A method as in claim 1 or 2 wherein said retail collector's receipt is a document selected from the group consisting of:
   (A) retail store purchase receipts;
   (b) restaurant receipts;
   (c) credit card purchase receipts;
   (d) gasoline purchase receipts;
   (e) ATM slips;
   (f) parking tickets;
   (g) theater ticket stubs;
   (h) fee collector receipts; and
   (i) paper slips.

5. A method of conducting a drawing sweepstake over the Internet using data from electronic receipts from provider merchants or fee collectors in which:
   (a) a plurality of players obtain an electronic receipt from providers, each said receipt displaying at least a time and a date;
   (b) the provider automatically logs on to the Internet and communicates with a server drawing web site;
   (c) the drawing web site displays a web page having a place where it is automatically filled in with a time and a date by the provider;
   (d) the drawing web site displaying said page also having a place that is automatically filled in with a zip code from the electronic receipt and when there is no zip code on the electronic receipt, the merchant or fee collector may fill in its own zip code; when no zip code is filled in, zip code is automatically randomly assigned by the web site and said place is automatically filled in, and
   (e) the drawing web site randomly selects a time, a data and a portion or all of a zip code and awards a prize to a player whose time, date and zip code most closely matches the selected time, date and zip code.

6. A method of automatically conducting a drawing sweepstake over the Internet using data from electronic receipts from a provider merchant or fee collector is which:

(a) a plurality of players obtain a receipt, each of the receipts displaying at least a date;

(b) the provider automatically logs on to the Internet and communicates with a server drawing web site;

(c) the drawing web site displays a web page having a place where it automatically is filled in with said date;

(d) the drawing web site displaying said page also having a place that is automatically filled in by the time on the receipts and when there is no time on the receipt, the log on time is automatically used;

(e) the drawing web site displaying said page also having a place that is automatically filled in with a zip code from the electronic receipt and when there is no zip code on the receipt, a zip code is automatically randomly assigned by the web site, and (f) the drawing web site randomly selects a date, time and portion or all of a zip code and awards a prize to a player whose date and time and zip code most closely matches the selected date and time and zip code.

7. A method of conducting a drawing sweepstake over a network using date from electronic receipts from a fee collector including:

(a) logging on to a network and communicating with a server drawing web site;

(b) the drawing web site displaying a web page having a place which the fee collector fills in with a time and a date from the receipt displaying at least a time and a date;

(c) the drawing web site displaying said page also having a place to be filled in with a zip code from the receipt, when there is no zip code on the receipt, a zip code is automatically randomly assigned by the web site and said palace is automatically filled in, and (d) the drawing web site randomly selects a time, a date and a portion or all of a zip code and awards a prize for the receipts whose time, date and zip code most closely matches the selected time, date and zip code.

8. A method of conducting a drawing sweepstake over a network using data from electronic receipts from a fee collector including:

(a) logging onto a network and communicating with a server drawing web site;

(b) the drawing web site displaying a web page having a place which the fee collector fills in with a date from the receipt displaying at least a date;

(c) the drawing web site displays a web page having a place to be filled in by the time on the receipt by the fee collector and when there is no time on the receipt the log on time is automatically used;

(d) the drawing web site displaying said web page also having a place where a zip code is filled in from the receipt and when there is no zip code on the receipt, a zip code is automatically randomly assigned by the web site and said place is automatically filled in, and (e) the drawing web site randomly selects a time, a date and a portion or all of a zip code and awards a prize for the receipt whose time, date and zip code most closely matches the selected time, date and zip code.

* * * * *